United States Patent [19]
Achenbach et al.

[11] 3,889,373
[45] June 17, 1975

[54] GRASS SHEARS WITH AN ELECTRIC MOTOR DRIVE

[75] Inventors: Dieter Achenbach, Betzdorf; Joswig Siegfried, Kausen, both of Germany

[73] Assignee: Wolf-Gerate GmbH, Germany

[22] Filed: Mar. 1, 1974

[21] Appl. No.: 447,274

[30] Foreign Application Priority Data
  Apr. 16, 1973  Germany.......................... 2319219

[52] U.S. Cl. ...................... 30/233; 56/246; 30/231
[51] Int. Cl. ........................................... B26b 19/38
[58] Field of Search ............ 30/201, 210, 216, 233, 30/287, 202, 286, 231; 56/17.4, DIG. 24, 246, 247, 248, 293

[56] References Cited
UNITED STATES PATENTS
| | | | |
|---|---|---|---|
| 1,572,644 | 2/1926 | Farnsworth...................... | 30/201 X |
| 1,745,997 | 2/1930 | Kocourek .......................... | 30/201 |
| 2,652,626 | 9/1953 | Dutcher............................ | 30/233 X |
| 3,264,735 | 8/1966 | Charme ............................ | 30/202 |

*Primary Examiner*—Al Lawrence Smith
*Assistant Examiner*—J. C. Peters
*Attorney, Agent, or Firm*—Ostrolenk, Faber, Gerb & Soffen

[57] ABSTRACT

The specification describes a grass shears with an electric motor drive for shears blades. A blade protective cover is provided which is connected in a moving manner with the casing of the shears. In the rest position it covers a gap between the shears blades at least partly and in the operational condition it can be slid back behind the shears blade gap.

12 Claims, 6 Drawing Figures

GRASS SHEARS WITH AN ELECTRIC MOTOR DRIVE

BACKGROUND OF INVENTION

1. Field to Which Invention Relates

The invention relates to a grass shears with an electric motor drive for the blades of the shears. 2. The Prior Art Since efficient rechargeable batteries or accumulators with small dimensions have become available battery-driven grass shears have become accepted on a large scale for cutting lawn edges and for cutting grass which grows in places which cannot be reached with a lawn mower. Such a lawn shears, which can also be used to a limited extent as a hedge shears, if the twigs to be cut do not exceed a certain diameter, nevertheless constitute a source of danger despite the relatively low drive power, because it would readily be possible for the fingers to be brought unintentionally into contact with the moving cutting knives or blades, and injury might result. Owing to the simple means for switching on using a push button it will be possible for example for the blades to be caused to act while the fingers of the other hand are touching the blades, for example for the purpose of cleaning or checking them. In particular it has been found that injury to the fingers also occurs during demonstration of the hedge shears in the shop, where the blades are frequently felt or the grass shears are taken hold of improperly by the buyer, or perhaps even by the shop assistant and the motor is started unintentionally.

SUMMARY OF INVENTION

One aim of the invention is to provide a protective device which in the rest position prevents an unintentional contact with the blades in movement but in use releases the shears blades so that cutting of grass without hinderance can be carried out.

The invention consists in a grass shears with an electric motor drive for shears blades, characterised in that a blade protective cover is provided which is connected in a moving manner with the casing of the shears and in the rest position covers a gap between the shears blades at least partly and in the operational condition can be slid back behind the shears blade gap.

Accordingly in the case of the invention it is not a question of one of the conventional protective covering caps, which when not in use are placed on the blades and are removed for use and can consequently easily be lost and even after a short period of use are not replaced on the blades or knives. Instead the protective cover in accordance with the invention operates completely automatically and ensures that when the shears is not being used it is effectively protected while as soon as the shears is used the blades are released automatically by making contact with the ground or the like.

Battery-driven grass shears at present on the market operate overwhelmingly in accordance with the scissors principle in such a manner that one blade is stationary and the other is driven via an eccentric and moves backwards and forwards over the fixed blade. The blades can have different breadths and numbers of teeth. Generally the blade gap or spacing between neighboring cooperating blade teeth, along which the blades of the shears are effective, extends along half the total length of the teeth of the blades, which teeth project out of the shears housing. In this manner it is possible to use protective covers which in the rest position completely cover the shears blade gap and in the use position are drawn back behind the rear part of the blades lying behind the blade gap without it being necessary to insert the protective cover for a substantial amount into the housing. In the case of comparatively long shears blade gaps the arrangement can, however, be so made that the upper cover plate is completely or partly drawn into the housing.

As an upper protective cover it is preferred to provide a plate-like bridge piece which is guided via lateral arms and is arranged at a certain distance from the upper moving knife. On the lower side the protective cover can be provided with a similar plate, which has steps or the like which are actuated or retained when contact is made with the ground and bring about an automatic drawing back of the protective cover.

In accordance with a further form of the invention the lower protective cover is formed by a roller which is journalled for rotation, lies under the blade tips in the rest position and brings about a specially easy and safe withdrawal of the protective cover, which is resiliently mounted, on use. It has been found that this roller, even although it does not cover the shears blade gap completely from below, can nevertheless guarantee sufficient safety because the shears blade tips are covered and it is hardly likely that the fingers of the user would be introduced into the remaining shears blade gap unless he was determined to use the shears improperly.

In accordance with a further form of the invention there is the provision of a mechanical withdrawing connection, which can then bring about a withdrawal of the protective cover when a cutting action is to be performed without making contact with the ground, that is to say when the grass is to be cut at a certain distance above the ground or when the grass shears is used for cutting hedges with thin twigs. This mechanical withdrawal device can be so arranged that it can be actuated with that hand which is used for holding the grass shears. For safety reasons it is, however, to be recommended to arrange this device in such a manner that it can be only actuated with the other free hand.

LIST OF SEVERAL VIEWS OF DRAWINGS

In what follows embodiments of the invention will be described with reference to the accompanying drawings.

DESCRIPTION OF PREFERRED EMBODIMENTS

In the case of the two embodiments on the shears housing 1 the lower blade 2 is firmly attached by screw means while the upper blade or knife 3 is driven via an eccentric and runs backwards and forwards over the lower blade.

Figure 1:
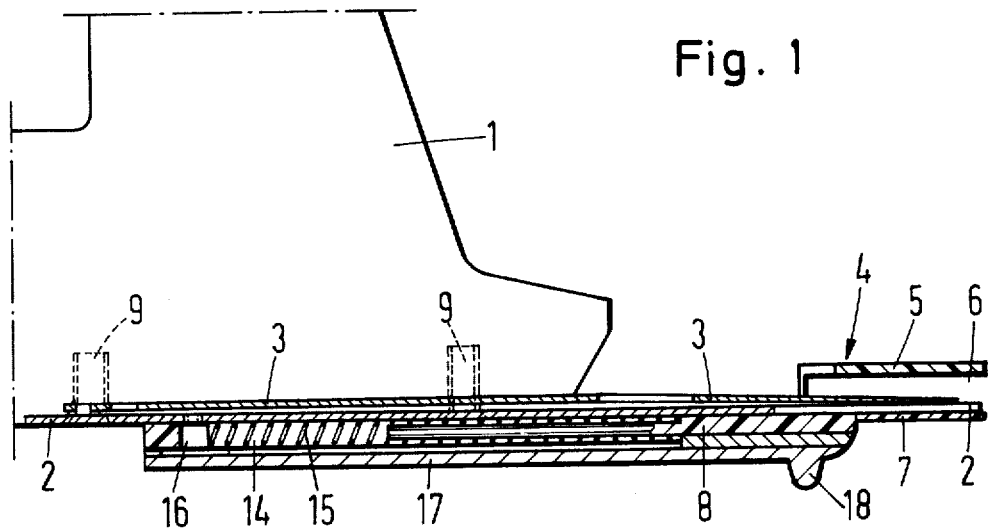
FIG. 1 is a partial sectional view of a grass shears with a protective cover in accordance with the invention, the line of section being denoted by I—I in FIG. 2.
Figure 2:
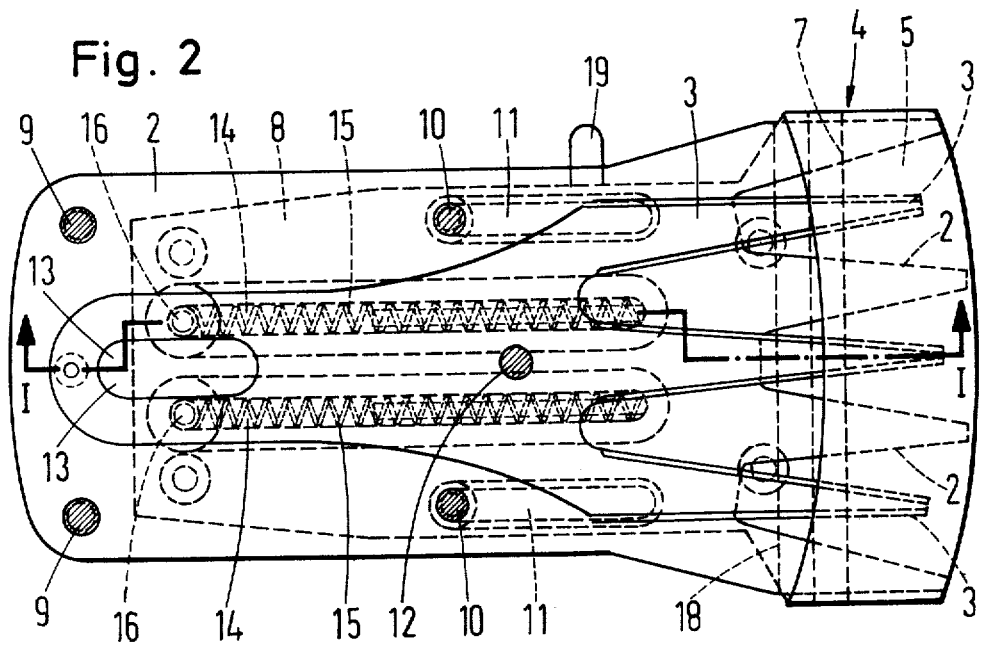
FIG. 2 shows a view of the grass shears in accordance with FIG. 1 from below in the rest position.
Figure 3:
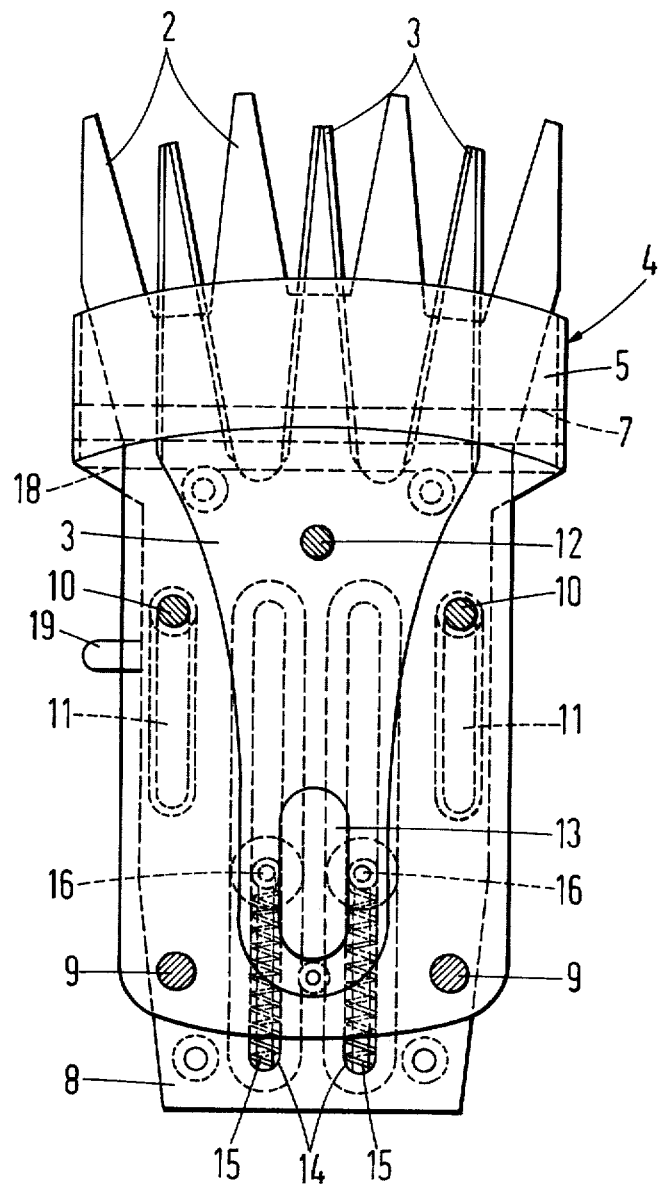
FIG. 3 is a view, corresponding to FIG. 2, of the grass shears in the operational condition.

In the case of the embodiment of the invention in accordance with FIGS. 1 to 3 the protective cover consists of a flat sleeve 4 with a curved upper plate 5, which lies so as to leave an intermediate space 6 between it and the moving blade 2. A lower plate 7 of the protective cover lies immediately adjacent to the fixed lower blade 2. This flat or flattened sleeve 4 is connected with a pushing plate 8, which can be slid in the longitudinal direction of the shears with respect to the shears housing 1.

The lower blade 2 is fixed with screws 9 on the housing 1. Screws 10 are fixed in this lower blade 2 and hold the pushing plate 8 in position and the plate 8 is provided with longitudinal slots 11, which serve for guiding the protective device or the pushing plate respectively. The pivot pin 12 constitutes the pivot axis of the upper blade 3 and in the slot recess 13 at the rear end there fits a drive eccentric which is not shown in the drawing. In the central longitudinal slots 14 of the pushing plate 8 compression helical springs 15 are arranged, which on the right-hand side (see FIG. 2) rest against the slot end and on the left-hand side abut against guide screws 16, which are screwed into the lower blade 2. In this manner the pushing plate 8 is urged together with the protective sleeve 4 in accordance with FIGS. 1 and 2 to the right. On the pushing plate 8 a protective plate 17 is screwed, which covers the longitudinal slots. The protective plate 17 carries at its front end a transverse bead or ridge 18 which projects downwards. During use of the shears the finger protecting means 4 is drawn back the lengths of the blade gap, i.e. the portion of the teeth of the blades over which neighboring cooperating blade teeth are separated by the bead 18 against the pressure of the springs 15 and as a result the blades or knives, as indicated in FIG. 3, are released, while as soon as the shears is lifted, the two springs 15 close the blade protective means again, bringing it into the starting position in accordance with FIGS. 1 and 2 covering the blade gap, and the cutting teeth of the blades or knives are again protected so that they cannot be touched by the hand or the fingers respectively.

On the left-hand side of the shears an operating projection 19 projects from the cover plate 17 and this projection 19 can be pushed back with the fingers, for example on cutting small bushes or hedges, that is to say when the shears is used without making contact with the ground.

The protective sleeve 4 with the pushing plate 8 and the cover plate 5 preferably consist of plastics material, though it is also possible to use sheet metal for this purpose.

Figure 4:
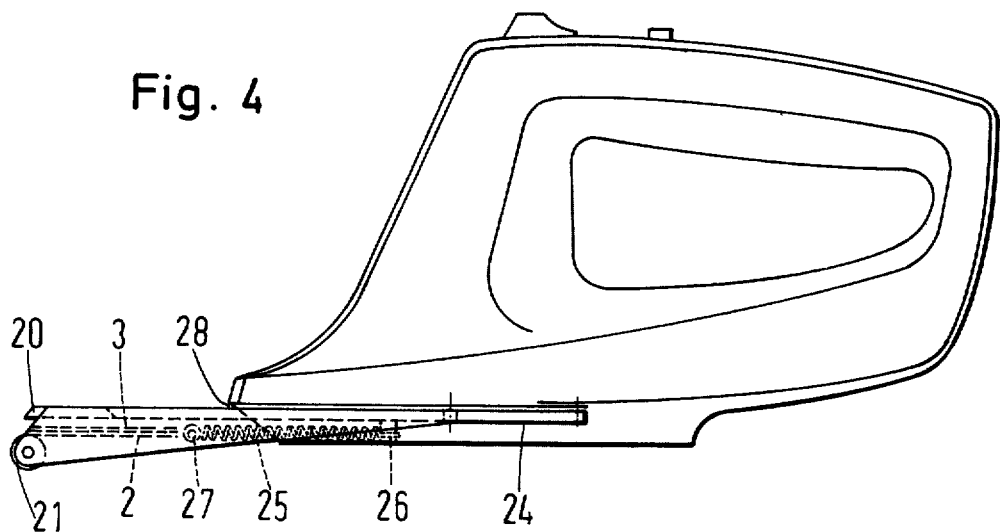
FIG. 4 is a side view of a further embodiment of a grass shears in accordance with the invention with a protective cover located in the rest position.
Figure 5:
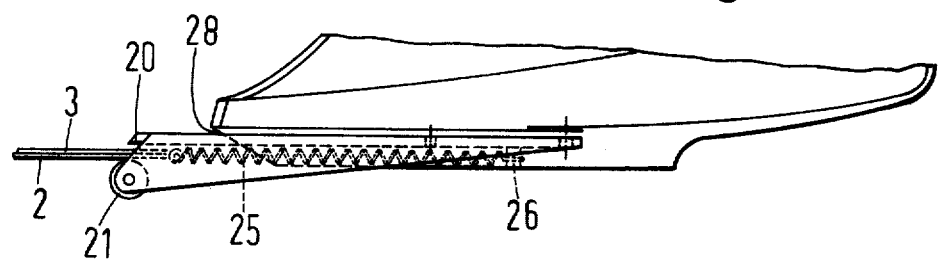
FIG. 5 is a partial view of the grass shears in accordance with FIG. 4 with the protective device drawn back.
Figure 6:
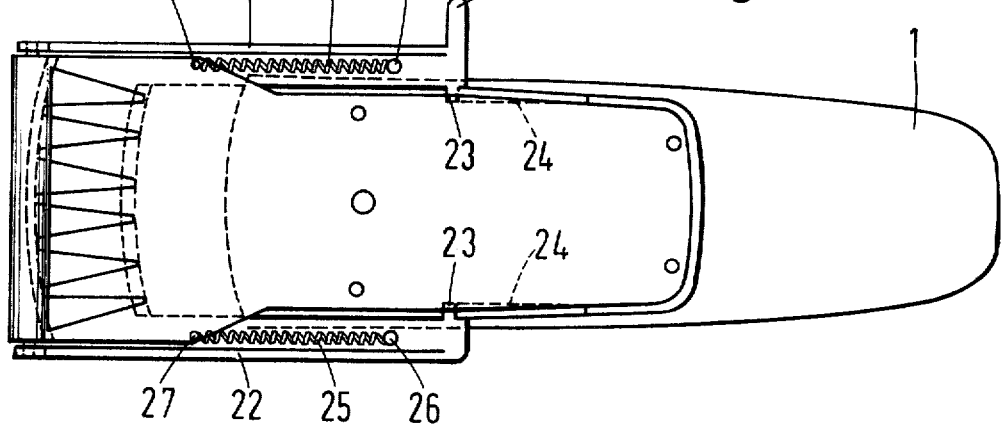
FIG. 6 is a view of the grass shears in accordance with FIG. 4 from below.

In the case of the embodiment in accordance with FIGS. 4 to 6 the protective cover consists of an upper arcuate cover plate 20 and a lower roller 21, which in the rest position in accordance with FIG. 4 comes to lie under the tips of the teeth of the cutting blades. The roller 21 has its outer periphery lying against the lower blade in accordance with a convenient embodiment of the invention, while between the upper cover plate and the moving blade an intermediate space is left. The plate 20 and the roller 21 are carried from lateral bridge pieces 22 running in the longitudinal direction, on whose ends a respective guide ramp 23 projects inwards. These ramps 23, run in lateral guide grooves 24 of the housing over the fixed knife or blade plate 2. The movement of the bridge pieces and thus of the cover plate is limited by the slot ends.

The cover device is urged by springs 25 into the covering position in accordance with FIG. 4. These springs are attached on the one hand with pins 26 of the bridge pieces 22 and on the other hand they are fitted in holes 27 of the fixed blade plate 22. As an abutment for the upper cover plate 20 use is made of the front housing edge 28. The finger protector consists in the case in this embodiment of the invention preferably of an injection moulding of plastics, though, however, the roller 21 can also be replaced by a bottom of plastics material (not shown in the drawing). In the case of the embodiment in accordance with FIGS. 4 to 6 as well on the moving bridge part on the left-hand side a handle 29 is arranged in order to be able to push back the finger protector manually if grass is to be cut at a higher level without making contact with the ground or if it is desired to trim bushes and hedges.

As can be seen from FIGS. 2 and 3 or 6, respectively, the blade gap formed between the individual blade teeth is substantially covered by the cover plates so that there is no possibility of injury in the non-operational or rest condition. In the drawn-back condition in accordance with FIGS. 3 and 5 the cover plates are pushed back to such an extent that the blade gap is substantially exposed and cutting without any hinderance can be carried out.

What we claim is:

1. A motorized grass shears with two generally flat, overlaid blades; each said blade having a plurality of teeth extending in the same first direction; means for moving one said blade with respect to the other said blade in a manner such that neighboring said teeth, one on each said blade, cooperate to cut and wherein a blade gap is defined as a first distance in from the free ends of said teeth, wherein neighboring said teeth are spaced apart;

blade protective means extending across said blade gap and comprising an upper cover plate above the upper said blade and a lower cover plate beneath the lower said blade;

means for guiding said protective means from a first position covering said blade gap, along a path away from said free ends of said teeth to a second position exposing said blade gap; biasing means for biasing said protective means to its said first position; said cover plates being shaped to be unbroken and in said first position they completely cover said blade gap.

2. A grass shears in accordance with claim 1, further comprising a projection projecting down from said lower cover plate for being engaged to move said protective means to its said second position.

3. A grass shears in accordance with claim 1, further comprising a projection extending transversely to said first direction of extension of said blade teeth and attached to said protective means for being engaged to move said protective means to its said second position.

4. A grass shears in accordance with claim 1, wherein said lower cover plate lies against said lower blade and shifts between said first and second positions along said lower blade.

5. A grass shears in accordance with claim 4, wherein said protective means comprises a generally flat sleeve having said upper cover plate above said upper blade and spaced therefrom by a predetermined distance, and also having said lower cover plate;

of said blades, said lower blade is fixed against the movement by a motor means and said upper blade is movable by the motor means relative to said lower blade.

6. A grass shears in accordance with claim 5, further comprising:

a pusher plate connected to said lower blade and movable with respect thereto; at least one slot in said pusher plate, each said slot extending in said first direction of extension of said teeth; a respective fixed projection on said lower blade extending into each said slot so as to guide movement of said pusher plate; said protective means being secured to said pusher plate to move therewith.

7. A grass shears in accordance with claim 6, further comprising a contact bead projecting down beneath said lower cover plate and located near the end of said lower cover plate near said blade teeth and extending transversely to said first direction of extension of said teeth and extending generally across said lower cover plate.

8. A grass shears in accordance with claim 6, further comprising a projection extending transversely to said first direction of extension of said blade teeth and attached to one of said protective means and said pusher plate for being engaged to move said protective means to its said second position.

9. A grass shears in accordance with claim 8, wherein said biasing means comprises a return spring connected at one end to said protective means and at the other end to said lower blade.

10. A grass shears in accordance with claim 2, wherein said projection comprises a roller beneath said lower plate and extending transversely to said first direction of said teeth and extending generally across said lower cover plate; roller support means on said protective means for supporting said roller in the aforesaid location and for causing said roller to shift with said protective means with respect to said blades.

11. A grass shears in accordance with claim 10, further comprising a housing to which said lower blade is fixed and in which said lower blade and said upper blade are housed and out of an end edge of which said teeth of both said blades project;

lateral connecting pieces extending along the side edges of said housing; said roller having ends journaled on said connecting pieces; a respective guide projection extending toward said blades and attached to each said connecting piece;

lateral guide slots along said side edges of said housing and each said guide projection extending into a said guide slot on its respective said side of said housing.

12. A grass shears in accordance with claim 11, further comprising a bridge piece joining said connecting pieces and shaped to avoid engaging said blades upon motion of said protective means;

said biasing means comprising a spring joining said lower blade at one end of said spring and said bridge piece at the other end of said spring.

* * * * *